(12) United States Patent
Tsujimoto

(10) Patent No.: US 7,724,689 B2
(45) Date of Patent: May 25, 2010

(54) INTERFACE DEVICE AND INTERFACE DEVICE CONTROL METHOD

(75) Inventor: Hiroyuki Tsujimoto, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 1261 days.

(21) Appl. No.: 10/725,587

(22) Filed: Dec. 3, 2003

(65) Prior Publication Data

US 2005/0117511 A1 Jun. 2, 2005

Related U.S. Application Data

(63) Continuation of application No. PCT/JP01/06013, filed on Jul. 11, 2001.

(51) Int. Cl.
*H04L 12/28* (2006.01)
(52) U.S. Cl. .................................. 370/257
(58) Field of Classification Search ............... 370/255, 370/257, 421, 465, 477, 395.2, 395.21, 395.64, 370/464–472, 254; 710/305, 58–60, 100, 710/104, 105, 107–125, 313; 709/253
See application file for complete search history.

(56) References Cited

U.S. PATENT DOCUMENTS

| | | | | |
|---|---|---|---|---|
| 5,097,410 | A * | 3/1992 | Hester et al. | 710/31 |
| 5,442,750 | A * | 8/1995 | Harriman et al. | 709/233 |
| 5,504,757 | A * | 4/1996 | Cook et al. | 370/468 |
| 5,621,901 | A * | 4/1997 | Morriss et al. | 710/305 |
| 5,774,702 | A * | 6/1998 | Mitsuishi et al. | 713/501 |
| 6,198,820 | B1 * | 3/2001 | Tetsushi | 379/413 |
| 6,460,097 | B1 * | 10/2002 | Harumoto et al. | 710/60 |
| 6,509,988 | B1 * | 1/2003 | Saito | 398/47 |
| 6,526,036 | B1 * | 2/2003 | Uchida et al. | 370/342 |
| 6,633,586 | B1 * | 10/2003 | Heiss | 370/468 |
| 6,829,225 | B2 * | 12/2004 | Staats | 370/255 |
| 6,870,855 | B2 * | 3/2005 | Fujimori et al. | 370/421 |

(Continued)

FOREIGN PATENT DOCUMENTS

JP 11-098159 4/1999

(Continued)

OTHER PUBLICATIONS

IEEE Std 802.3u-195-95, 1995, title page, pp. 27, 28,37,38,42,51-53,56,235,236,239-241,249,250,344,345.*

*Primary Examiner*—Kwang B Yao
*Assistant Examiner*—Kenan Cehic
(74) *Attorney, Agent, or Firm*—Staas & Halsey LLP

(57) ABSTRACT

An interface device and interface device control method that switches a transmission rate to enable high-speed transmission when necessary. In devices (nodes) provided with an interface device, a transmission rate control circuit decreases the frequency of a clock signal to only enable low-speed transmission operations during low-speed transmission and when a transfer operation is not being performed. A node requiring switching to a high-speed transmission rate negotiates with each node included in a route to a transfer destination and reads the device information stored in the register to confirm whether or not each node has a transmission capacity applicable for high-speed transmission. Then, when the transmission capacity is applicable for high-speed transmission, the transmission rate control circuit increases the frequency of the clock signal to change the operating speed of its node and each of the nodes requiring the switching of the transmission rate to high-speed transmission.

10 Claims, 13 Drawing Sheets

U.S. PATENT DOCUMENTS

| | | | |
|---|---|---|---|
| 6,950,408 B1 * | 9/2005 | Domon et al. | 370/257 |
| 2001/0042153 A1 * | 11/2001 | Adachi | 710/129 |
| 2002/0004872 A1 * | 1/2002 | Ono | 710/305 |
| 2002/0112106 A1 * | 8/2002 | Henehan et al. | 710/113 |
| 2002/0152341 A1 * | 10/2002 | Bennett | 710/104 |
| 2004/0037233 A1 * | 2/2004 | Suzuki et al. | 370/252 |

FOREIGN PATENT DOCUMENTS

| | | |
|---|---|---|
| JP | 2000-232465 | 8/2000 |
| JP | 2001-111580 | 4/2001 |
| JP | 2001-117826 | 4/2001 |

* cited by examiner

| Register Abbreviation | Description | |
|---|---|---|
| C_SPEED (20a) | Display Device Transmission Capacity | |
| | 00 : S100 | |
| | 01 : S200 | |
| | 1x : S400 | |
| P_SPEED (20b) | Current Operating State | |
| | 00 : S100 | |
| | 01 : S200 | |
| | 1x : S400 | |
| N_SPEED (20c) | Operating State after Next Bus Reset | |
| | 00 : S100 | |
| | 01 : S200 | |
| | 1x : S400 | |
| CHG_MODE (20d) | 0 : Clear for Each Bus Reset | |
| | 1 : Do Not Clear for Each Bus Reset | |

Fig.10 Tranfer Rate Switch Request Receiving Side

INTERFACE DEVICE AND INTERFACE DEVICE CONTROL METHOD

CROSS-REFERENCE TO RELATED APPLICATIONS

This application is a continuing application, filed under 35 U.S.C. §111(a), of International Application PCT/JP01/006013, filed Jul. 11, 2001.

BACKGROUND OF THE INVENTION

The present invention relates to an interface device and an interface device control method, and more specifically, to an interface device having a plurality of regulated transmission rates, and a method for controlling the interface device.

In recent years, interface devices have been provided with a function for performing communication at different transmission rates, which are determined depending on when and how the standard of each transmission rate is established. Further, standards enabling data transmission at higher speeds are being added. These interface devices employ a proper transmission rate based on the data transmission requirements and power consumption requirements of the apparatus in which the interface device is installed. As a result, apparatuses with installed interfaces having different maximum speed transmission rates (transfer capabilities) are connected to networks. In such interface devices, the devices capable of high-speed data transmission are all capable of low-speed data transmission. In this way, data can be transferred between various devices connected to the network regardless of the maximum transmission rate of each device.

PRIOR ART

FIG. 12 is a schematic block diagram of an interface device in compliance with the conventional IEEE 1394 standard. The interface device 131 is installed in devices such as personal computers, as well as digital cameras, color page printers and the like connected to personal computers, and is connected to an apparatus body 132 provided with the functions of these various devices.

The interface device 131 includes input/output ports (1394 port 1 and 2) 133 and 134, a physical layer circuit (PHY) 135, a link layer circuit (LINK) 136, a data buffer 137, clock generation circuit (CK gen) 138, and an MPU 139. The input/output ports 133 and 134 of the interface device 131 are connected to an IEEE 1394 interface bus (hereinafter, 1394 bus) 22, and the interface device 131 is connected to a plurality of other devices (other interface devices) by the 1394 bus 22.

When receiving input data (packets) from the input/output ports 133 and 134, the physical layer circuit 135 converts the electric signals to logic signals and outputs the logic signals to the link layer circuit 136. Conversely, the physical layer circuit 135 converts logic signals from the link layer circuit 136 to packets of electric signals and transmits the packets to the input/output ports 133 and 134.

The link layer circuit 136 analyzes the packet received and transmitted by the physical layer circuit 135, and stores packets addressed to itself in the data buffer 137. Conversely, the link layer circuit 136 outputs the packets stored in the data buffer 137 from the MPU 139 to the physical layer circuit 135 during data transmission.

The link layer circuit 136 analyzes the packets received from the physical layer circuit 135 and transmits packets that are not addressed to itself to the physical layer circuit 135. Thus, the interface device 131 transfers packets that are not addressed to itself.

The clock generation circuit 138 generates a clock signal having a frequency, which is obtained by dividing a reference frequency by a set frequency division ratio, and provides the clock signal to the physical layer circuit 135 and the link layer circuit 136.

FIG. 13 is a network diagram showing a plurality of devices (hereinafter referred to as nodes) with an IEEE 1394 compliance interface device 131 connected to the network via a 1394 bus 22.

Node n1 has a transmission capacity of S100, and nodes n2 through n7 have a transmission capacity of S400. The IEEE 1394 standard regulates three transmission rates, S400 (400 Mbit/s), S200 (200 Mbit/s), and S100 (100 Mbit/s), and nodes provided with the S400 transmission capacity are also capable of S200 and S100 transmission rates.

When a packet is transmitted from node n6 to node n4, node n1 has an S100 transmission capacity. Thus, each node in the transmission route from node n6 to node n4 sends or receives the packet at the S100 transmission rate through negotiation. That is, the S100 packet is transferred through a route including node n6, node n5, node n1, node n2, node n3, and node n4.

When transmitting the S100 packet from node n6 to node n4, the nodes n6 and n4, which transmits and receives data, and the nodes n2, n3 and n5, which function as repeaters, operate in a state enabling data transmission at its maximum transmission rate. Node n7, which is not performing data transmission at this time, is in a standby state and is also in a state enabling data transmission at its maximum transmission rate.

The nodes n2 through n7, which are connected to the network, are operated in a state that is required for performing data transmission at their respective maximum transmission rates (S400). In other words, each of the nodes n2 through n7 have internal circuits that normally operate at high speed to enable high-speed signal change during high-speed transmission.

Therefore, during periods when the nodes n2 through n7 are performing low-speed transmission or periods when they are not transferring data, they are capable of promptly responding to a transfer request even if that request is a high-speed transmission request from another node.

In order to immediately respond to high-speed transmission requests, however, the internal circuits must normally operate at high speeds. This increases power consumption. That is, in conventional interface devices, the devices capable of high-speed transmission consume power in an unnecessary manner since the internal circuits operate at high speeds even when high-speed transmission is not required or when no transfer is required. This increases power consumption.

Although consideration has been given to methods that stop the circuit operation in nodes that are not performing data transmission so as to reduce power consumption. However, these circuits cannot be stopped since the network configuration (topology) must be maintained. Thus, power consumption cannot be suppressed.

SUMMARY OF THE INVENTION

It is an object of the present invention to provide an interface device and a method for controlling the interface device that switches the transmission rate to enable high-speed transmission when necessary.

A first aspect of the present invention provides an interface device for performing data transmission with a further device connected to a network at any of a plurality of transmission rates that are regulated. The interface device includes a transmission rate control circuit for changing its own operation speed when the transmission rate must be switched.

A second aspect of the present invention provides a method for controlling an interface device for performing data transmission with other devices connected to a network at any of a plurality of transmission rates that are regulated. The method includes changing operation speeds of each device and the interface device when switching to a high-speed transmission rate is required and each device included in a route to a transmission destination is compatible for high-speed transmission.

DETAILED DESCRIPTION OF THE PREFERRED EMBODIMENTS

The present invention embodied in an interface device in compliance with the IEEE 1394 standard will now be discussed with reference to FIGS. 1 through 11.

Figure 1:
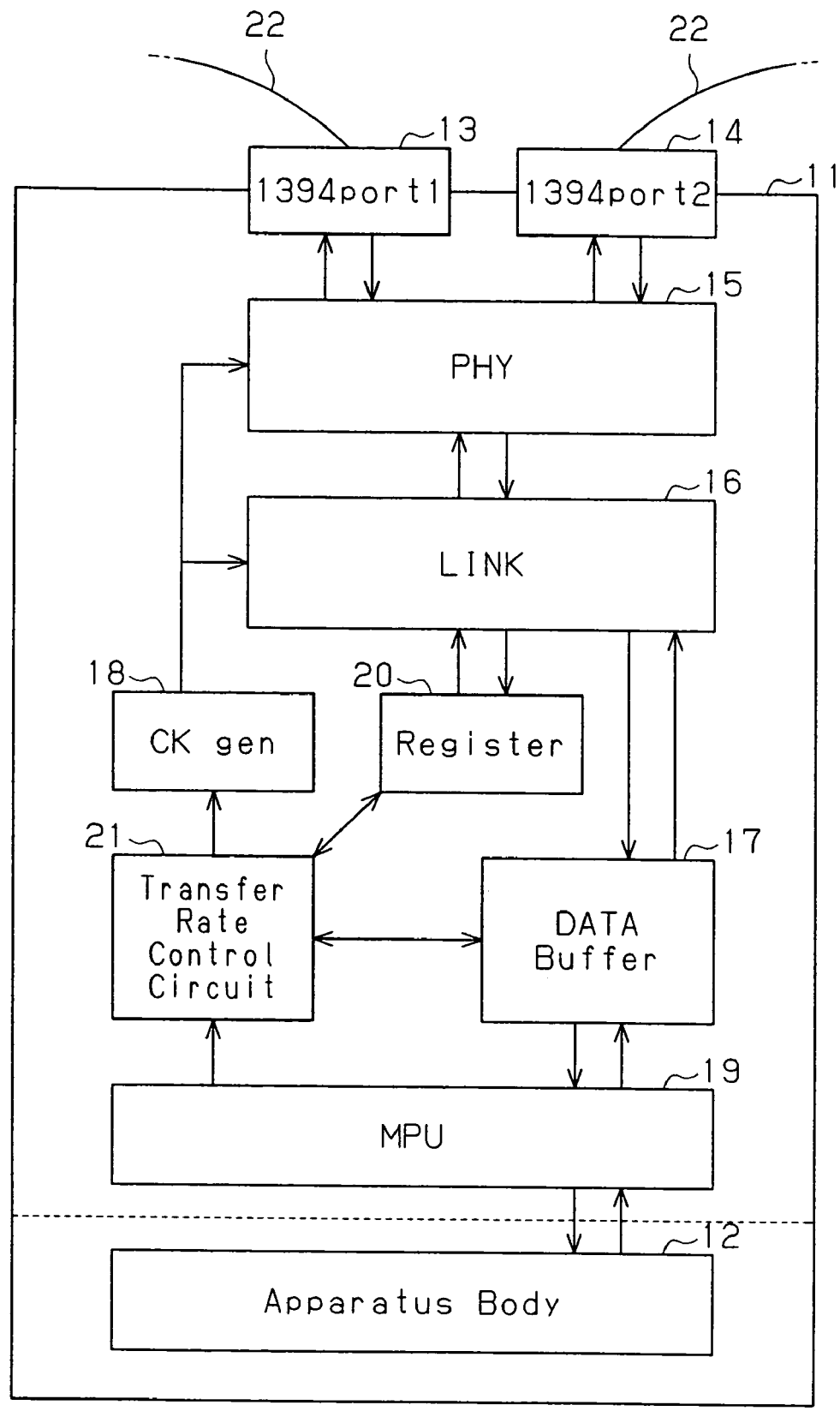
FIG. 1 is a block diagram of an embodiment of the interface device.

FIG. 1 is a schematic block diagram showing the interface device complying to the IEEE 1394 standard. The interface device 11 is installed in devices such as personal computers, as well as digital cameras, color page printers and the like connected to personal computers, and is connected to an apparatus body 12 provided with the functions of these various devices.

The interface device 11 includes input/output (input/output) ports (1394 port 1 and 2) 13 and 14, a physical layer circuit (PHY) 15, a link layer circuit (LINK) 16, a data buffer 17, a clock generation circuit (CK gen) 18, an MPU 19, a register 20, and a transmission rate control circuit 21.

The input/output ports 13 and 14 are connected to the input/output ports of other interface devices (not shown) through an IEEE 1394 interface bus (hereinafter, 1394 bus) 22. Devices provided with the installed interface device 11 are connected to other devices (other interface devices) by the 1394 bus 22 to configure a network.

When input data (packets) are received from the input/output ports 13 and 14, the physical layer circuit 15 converts the electric signals (signals having a voltage level based on communication standards) to a logic signal (signal having a logic level), which is then output to the link layer circuit 16. Conversely, the physical layer circuit 15 converts logic signals from the link layer circuit 16 to packets of electric signals and transmits the packets to the input/output ports 13 and 14.

The link layer circuit 16 analyzes the packet received and transmitted by the physical layer circuit 15, and stores packets addressed to itself in the data buffer 17. Conversely, when transmitting data, the link layer circuit 16 transmits the packet stored in the data buffer 17 from the MPU 19 to the physical layer circuit 15.

The link layer circuit 16 also analyzes packets received by the physical layer circuit 15 and sends those packets that are not addressed to itself to the physical layer circuit 15. In this way, the interface device 11 transfers packets that are not addressed to itself.

Device information of the interface device 11 is recorded in the register 20. The device information is updated information by a bus reset generated whenever the network configuration (topology) changes. The device information stored in the register 20 includes the transmission capacity of the interface device 11, as will be described later, the present transmission rate, the transmission rate after bus reset, an operating mode indicating whether or not the operation state has been cleared (changed) by the bus reset, and the like. Other devices (other interface devices 11) connected to the network recognize the transmission capacity of the interface device 11 by reading the register 20.

The transmission rate control circuit 21 generates a switch signal to switch the operating speed so as to change its own transmission rate in response to a transmission rate switch request received from the apparatus body 12 or another device (another interface device). More specifically, when a packet with a transmission rate switch request is received from the data buffer 17, the transmission rate control circuit 21 monitors its present transfer state and determines whether or not a switching operation is possible, and when a switching operation is possible, outputs a clock switch signal to the clock generation circuit 18. Conversely, when a switching operation cannot be performed when data is presently being transferred, the clock switch signal is output after the current transfer operation ends.

The clock generation circuit 18 changes the frequency division ratio in response to the clock switch signal from the transmission rate control circuit 21 and generates a clock signal, which has a frequency obtained by dividing a reference frequency by the frequency division ratio. Then, the clock signal generated by the clock generation circuit 18 is supplied to the physical layer circuit 15 and the link layer circuit 16. The physical layer circuit 15 and the link layer circuit 16 operate using the provided clock signal as a criterion. The frequency division ratio is set in accordance with the transmission rate, such that the clock signal has a low frequency when the transmission rate is low. Accordingly, the lower the frequency of the clock signal, the lower the operating speed, or the transmission rate.

Figure 2:
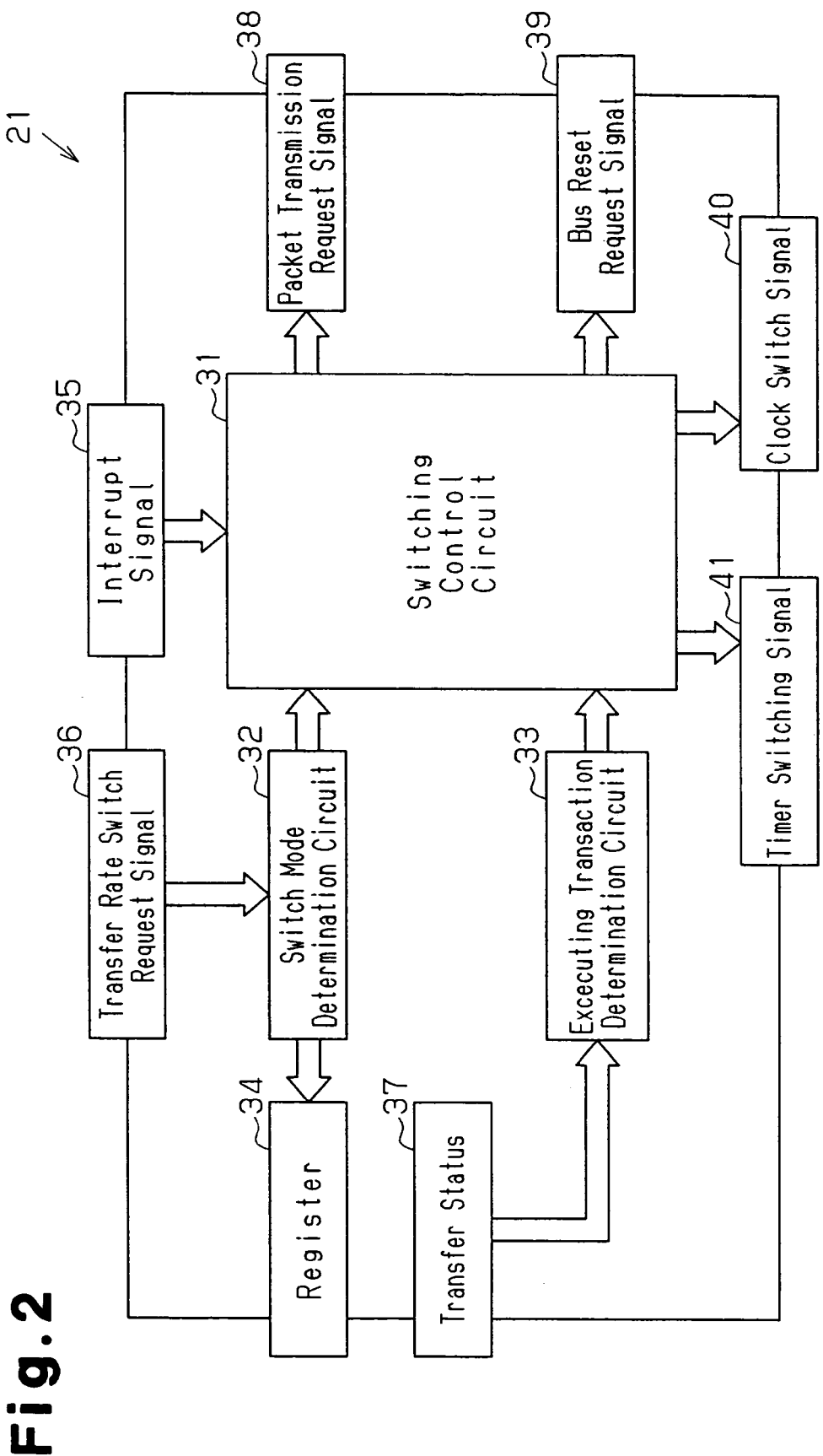
FIG. 2 is a block diagram showing a specific structure of the transmission rate switching control circuit.

FIG. 2 is a schematic block diagram specifically showing the configuration of the transmission rate control circuit 21.

The transmission rate control circuit 21 is provided with a switching control circuit 31, a switching mode determination circuit 32, an executing transaction determination circuit 33, and a register (Control and Status Register (CSR)) 34.

The switching control circuit 31 switches operations based on an interrupt signal 35 (for example, reception of various types of packets such as a bus reset request, a transmission rate switching request, or the like) from another device (another interface device) connected to the network.

The switching mode determination circuit 32 determines whether the transmission rate is specified in a request to switch to another transmission rate in response to a transmission rate switching request signal (packet) 36 from the data buffer 17 (refer to FIG. 1), and outputs the determination result to the switching control circuit 31.

More specifically, the interface device 11, which is in compliance with the IEEE 1394 standard, regulates three transmission rates, i.e., S400 (400 Mbit/s), S200 (200 Mbit/s), and S100 (100 Mbit/s). Devices provided with the S400 transmission capacity are configured to be compatible with the S200 and S100 transmission rates, and similarly, devices provided with the S200 transmission capacity are configured to be compatible with the S100 transmission rate.

Therefore, the switching mode determination circuit 32 determines which one of the transmission rates to S400, S200, or S100 the transmission rate switching request signal 36 is requesting. Further, the switching mode determination circuit 32 determines whether or not to return (clear the operating condition) the transmission rate to S100 when a bus reset occurs to reconfigure the network. Then, the switching mode determination circuit 32 outputs the determination results to the switching control circuit 31.

The executing transaction determination circuit 33 monitors its transfer status 37, determines whether or not there is a transaction that is presently being performed (i.e., whether or not data transmission is presently on-going), and outputs the determination result to the switching control circuit 31.

The switching control circuit 31 receives the determination result from the switching mode determination circuit 32 and the executing transaction determination circuit 33 and outputs a packet transmission request signal 38, which includes information regarding whether or not to acknowledge the switching request signal 36, to the link layer circuit 16. When an acknowledgement packet transmission request signal 38 is output at this time, the switching control circuit 31 outputs a bus reset request signal 39 to the physical layer circuit 15.

Then, when the bus reset starts, the switching control circuit 31 outputs a clock switch signal 40 to the clock generation circuit 18, and the clock generation circuit 18 switches the frequency of the clock signal supplied to the physical layer circuit 15 and the link layer circuit 16. As a result, the transmission rate of the interface device 11 is switched.

When the clock switch signal 40 is output, the switching control circuit 31 outputs a timer switching signal 41 to the physical layer circuit 15 and the link layer circuit 16 to switch the timer operation clocks of these circuits.

Figure 3:
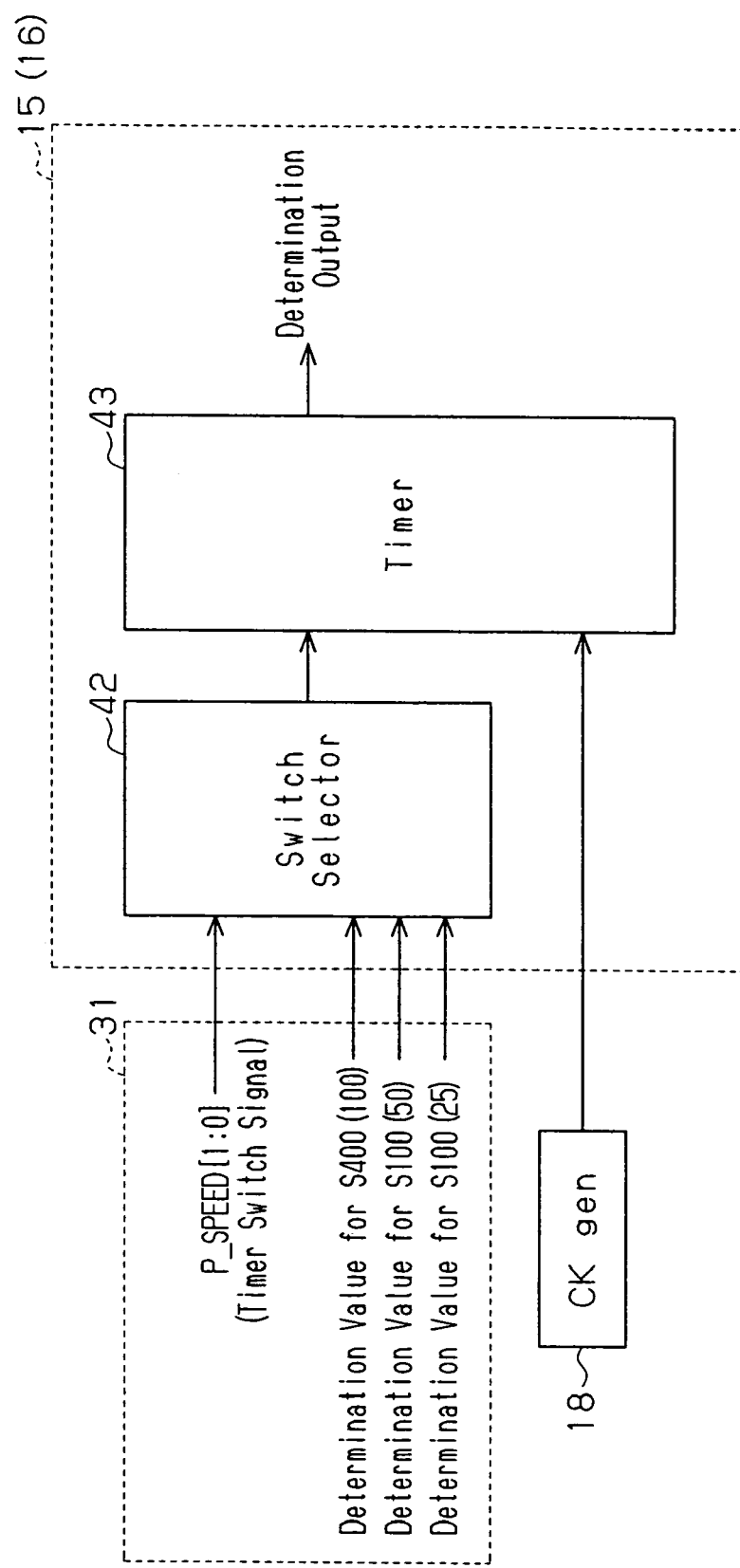
FIG. 3 is a block diagram illustrating the transmission rate switching operation.

More specifically, as shown in FIG. 3, the timer switching signal 41 (represented by P-SPEED in the drawing) output from the switching control circuit 31 is input to a switch selector 42 of the physical layer circuit 15 (link layer circuit 16). P-SPEED is the current transmission rate of the interface device 11 represented as a bit control signal, as will be described later.

The switch selector 42 outputs a selected determination value corresponding to the various transmission rates S400, S200, S100 to the timer 43 based on the timer switching signal 41 (that is, the present transmission rate P-SPEED). In other words, the switch selector 42 switches the determination value of a timer 43 when a clock signal timeout is determined in response to the timer switching signal 41. In the present embodiment, the determination values corresponding to each transmission rate S400, S200, S100 are set at 100, 50, 25, respectively.

The timer 43 counts the pulses of the clock signals provided from the clock generation circuit 18. When the count value matches the determination value provided from the switch selector 42, the timer 43 outputs the determination. For example, when the timer 43 outputs a low determination signal and the count value matches the determination value, the timer outputs a high determination signal during a single cycle of the clock signal. The physical layer circuit 15 (link layer circuit 16) performs a data transmission timeout based on the determination signal.

The clock signal has a frequency that corresponds to the operating speed (transmission rate) of the physical layer circuit 15 (link layer circuit 16), and the determination value is set in accordance with the transmission rate. Accordingly, the timer 43 outputs a determination signal each time a fixed period elapses regardless of the operating speed. Therefore, the time of the timeout determination is constant and not affected by the operating speed and transmission rate.

Figure 4:
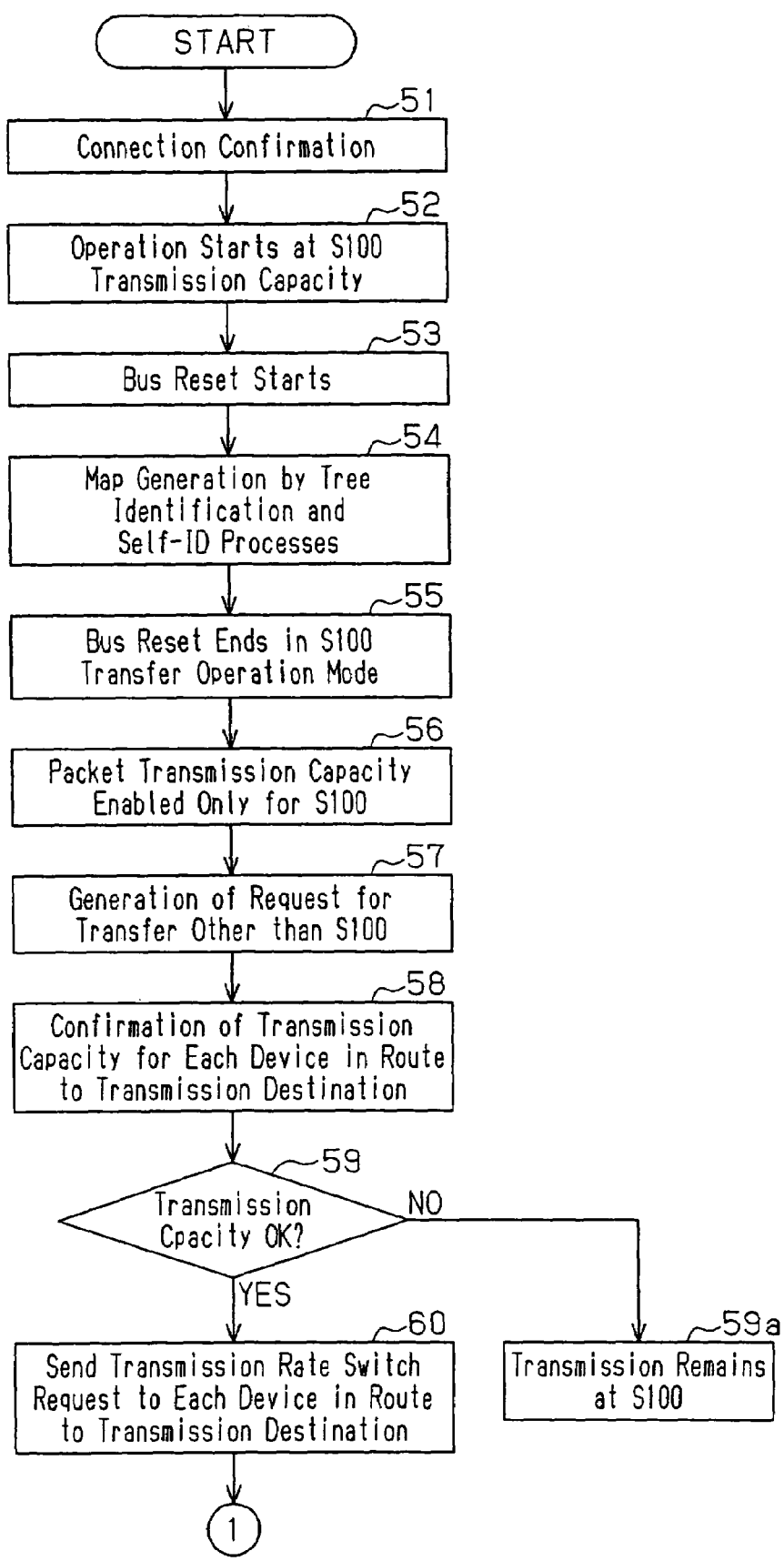
FIG. 4 is a flow chart illustrating the transmission rate switching operation.
Figure 5:
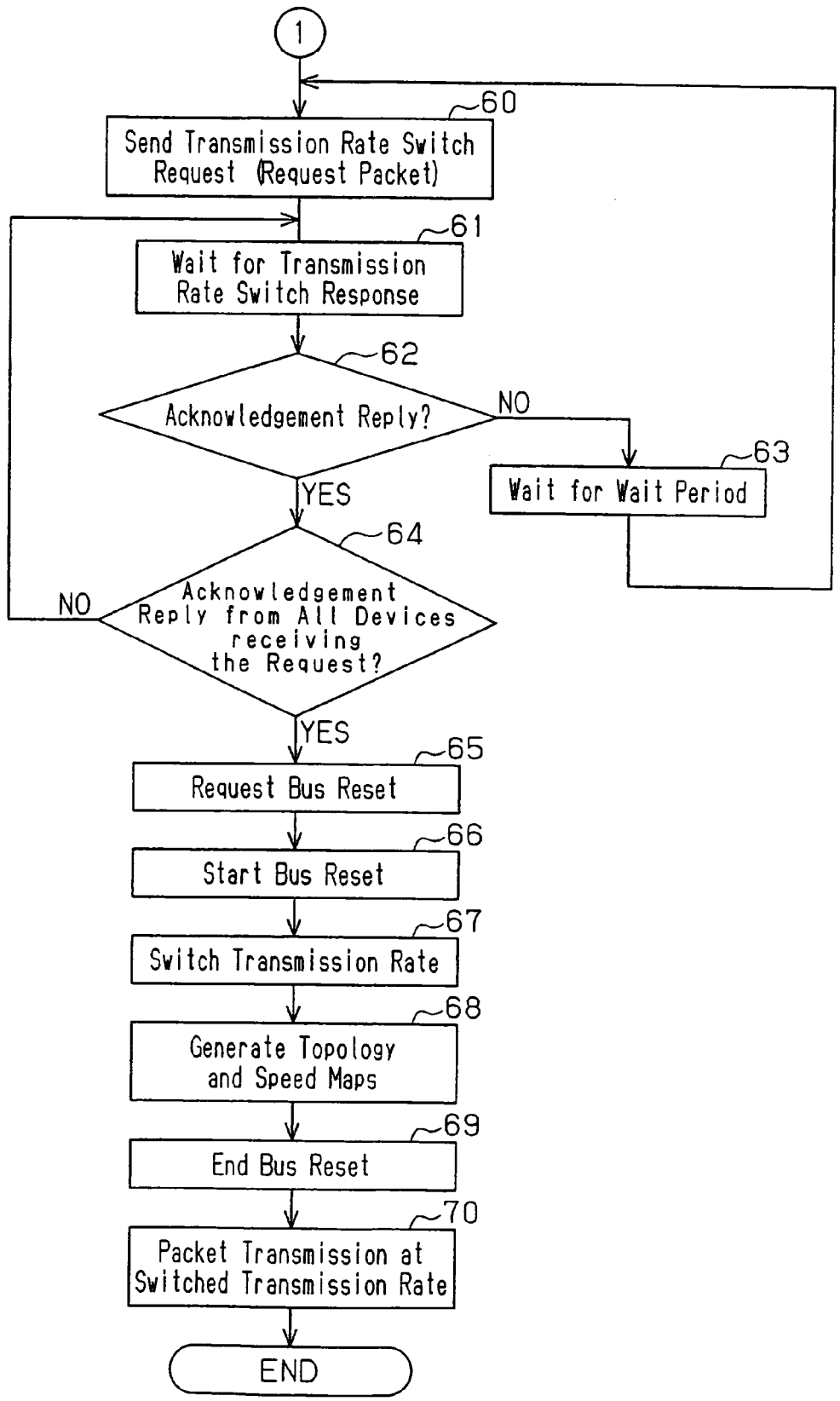
FIG. 5 is a flow chart illustrating the transmission rate switching operation.
Figure 6:
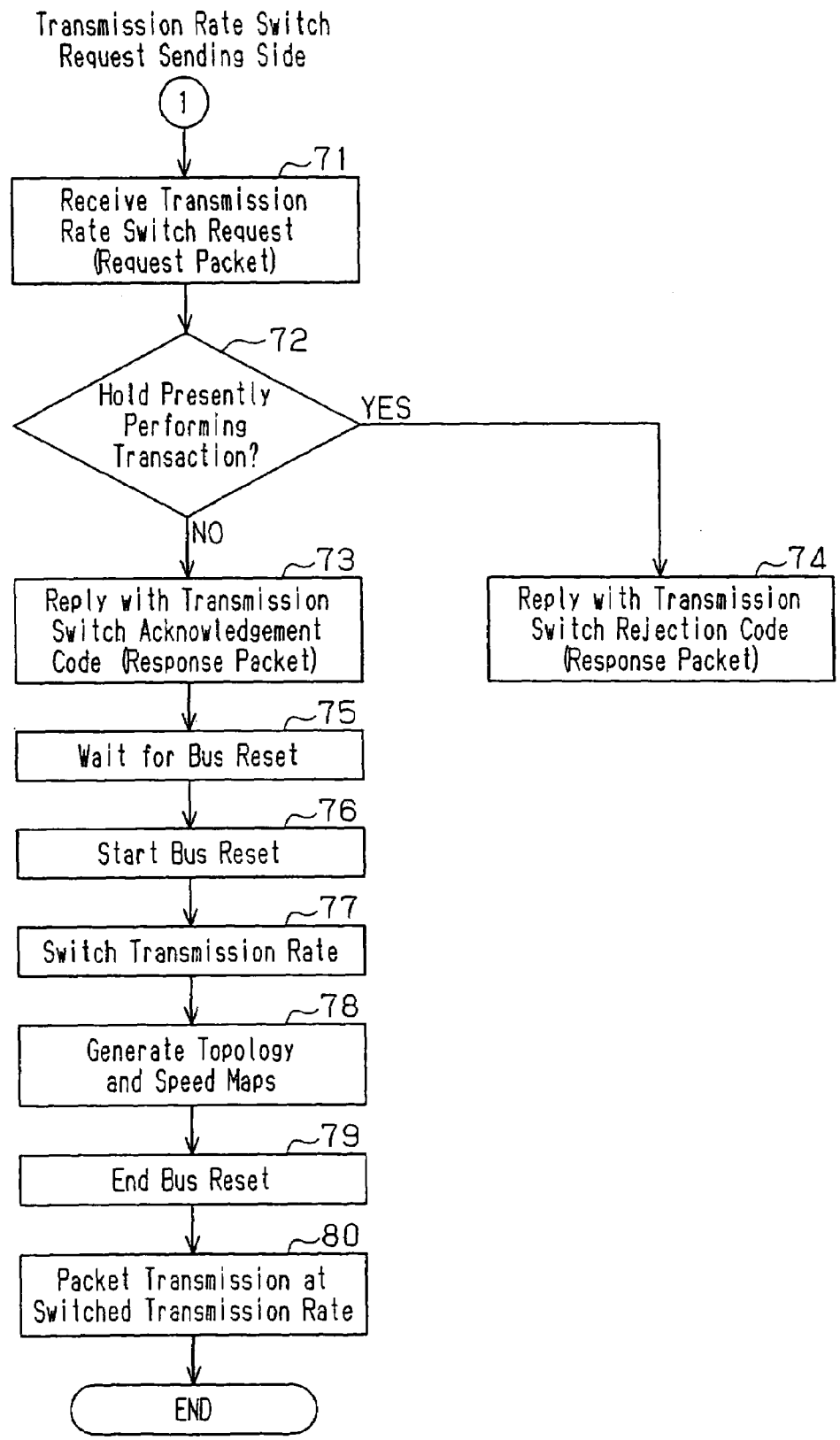
FIG. 6 is a flow chart illustrating the transmission rate switching operation.
Figure 13:
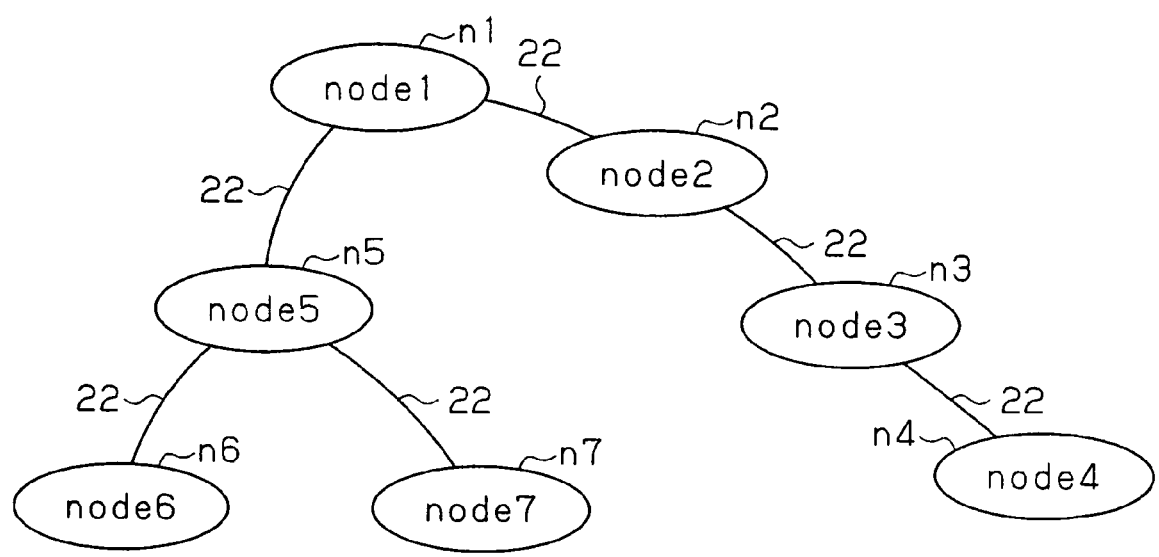
FIG. 13 is a schematic diagram showing an example of devices with installed interface devices connected by a bus.

The operation of the interface device 11 is described below with reference to the flow charts of FIGS. 4 through 6. A plurality of devices (hereinafter referred to as nodes) provided with the interface device 11 of the present embodiment are connected by the 1394 bus 22 to configure a network, as shown in FIG. 13. To simplify the description, each node is described using the same number as its reference number.

When the node n1, which is provided with the S400 transmission capacity, is connected to the network (step 51), the node n1 starts operating at the S100 transmission rate (step 52), and the bus reset starts (step 53).

When the bus reset starts, the node n1 generates a topology map and speed map in the register 20 (refer to FIG. 1) through tree identification and self-identification processes (step 54). More specifically, the node n1 transmits a self-identification packet (self-ID packet) to all the other nodes n2 through n7. The self-ID packet includes information on which transmission rates the node supports. That is, the node n1 recognizes the topology and identifies the other nodes n2 through n7 and recognizes the transmission capabilities of the other nodes n2 through n7 by means of the self-ID packets transmitted from the other nodes n2 through n7.

In this way, when the bus reset to the S100 transmission rate ends (step 55), the node n1 is capable of transferring data (packets) only at the S100 transmission rate (step 56).

Similarly, the nodes n2 through n7 create a topology map and speed map in response to the bus reset, the transmission of data (packets) is enabled only at the S100 transmission rate.

Then, when it becomes-necessary to transfer data at a higher speed (S200 or S400) than the S100 transmission rate from, for example, node n1 to node n4 (step 57), the node n1 negotiates with the nodes n2 through n4 included in the route to the transfer destination.

More specifically, the node n1 confirms the transfer capabilities of each of the nodes n2 through n4 configuring the route to the transfer destination by reading the device information in the register 20 with which each of the nodes n2 through n4 are provided (step 58). In this way, the node n1 determines whether or not each of the nodes n2 through n4 are provided with a transmission capacity corresponding to high-speed transmission (step 59).

In step 59, when all of the nodes n2 through n4 in the transmission route are provided with higher speed transmission capacity, the node n1 transmits a transmission rate switch request packet (request packet), which includes information on the transmission rate to be switched to, to the nodes n2 through n4 (step 60). Conversely, when even one node among all the nodes n2 through n4 in the transmission route is not provided with a higher speed transmission capacity (that is, only supports S100), the node n1 continues to transfer data at the S100 transmission rate (step 59a).

The operation of the node n1 while transmitting a transmission rate switch request is described below with reference to FIG. 5.

When transmitting a request packet in step 60, the node n1 waits for a reply (response packet) acknowledging the switch request from each of the nodes n2 through n4 (step 61). When the response packets are received, the node n1 determines whether or not it is an acknowledgement reply (step 62). When the reply is not an acknowledgement, the node n1 waits a predetermined wait period (step 63), and again transmits the request packet (step 60).

The node n1 determines whether or not reply acknowledging the switch request has been received from all the nodes n2 through n4 in the transmission route (step 64). When all replies have not been received, the node n1 waits for the response to the transfer switch request (step 61).

When replies acknowledging the switch request have been received from all the nodes n2 through n4 in the transmission route, the node n1 transmits a packet requesting a bus reset to the nodes n2 through n4 (step 65). As described above, the node n1 outputs a bus reset request signal 39 from its switching control circuit 31 to the physical layer circuit 15, and then waits until the bus reset starts (refer to FIG. 2).

When the bus reset starts in node n1 (step 66), the transmission rate of the node n1 is switched to a high-speed transmission rate by the transmission rate control circuit 21 (that is, the frequency of the clock signal is switched) (step 67).

Then, when a new topology map and speed map are generated in the register 20 by the tree identification and self-ID processes and the bus reset ends (steps 68 and 69), the node n1 executes performs packet transmission at the newly switched high-speed transmission rate (step 70).

The operation of the nodes n2 through n4, which have received a transmission rate switch request from the node n1, will now be described with reference to FIG. 6.

When the request packet is received from the node n1 (step 71), the nodes n2 through n4 determine whether or not to hold the transaction that is presently being executed (step 72). More specifically, when a packet is presently being transmitted, each of the nodes n2 through n4 determine whether or not to respond to the switch request after the current transfer operation ends, or to respond to the switch request from the node n1 with priority over the transmission operation presently being performed.

In step 72, the nodes among the nodes n2 through n4 that are not transmitting anything and the nodes that are able to respond to the switch request send a packet (response packet), which includes information acknowledging the switch request, to the node n1 (step 73). Conversely, the nodes among the nodes n2 through n4 which are unable to immediately respond to the switch request since packet transmission is presently being performed send a packet, which includes information about being unable to acknowledge the switch request, to the node n1 (step 74) and wait until a switch request is again received from the node n1.

In step 73, the nodes that respond to the switch request wait until a bus reset request packet is received from the node n1 (step 75), and when this request is received, the bus reset starts (step 76).

Then, when the bus reset starts in step 76, the transmission rates of the nodes n2 through n4 are switched to high-speed transmission as described above (that is, the frequency of the clock signal is switched) (step 77).

Then, when new topology and speed maps are generated by the tree identification and self-ID processes in the manner described above and the bus reset ends (steps 78 and 79), packet transfer is executed by the nodes n2 through n4 at the switched high-speed transmission rate (step 80).

Figure 7:
FIG. 7 is an explanatory diagram illustrating a register.

FIG. 7 specifically shows the configuration of the register 20.

The register 20 is provided with memory areas 20a, 20b, and 20c for storing C-SPEED, which represents the transmission capacity of the interface device 11, P-SPEED, which represents the present transmission rate (operating state), and N-SPEED, which represents the transmission rate (operating state) after the next bus reset. The register 20 also has an area 20d for storing the CHG-MODE, which represents operating modes for whether or not to clear the operating state each time there is a bus reset, i.e., whether or not to restore the transmission rate to S100 by means of the bus reset.

In the present embodiment, the S100, S200, and S400 transmission rates, which correspond, for example, to 2-bit control signals [00], [01], and [1x] (either [10] or [11]), are stored in the respective C-SPEED, P-SPEED, and N-SPEED areas 20a through 20c.

Operating modes are stored in the CHG-MODE area 20d to clear the operating state after the next bus reset in correspondence with, for example, the control signal [0], or maintain the operating state after the next bus reset in correspondence with the control signal [1].

Figure 8:
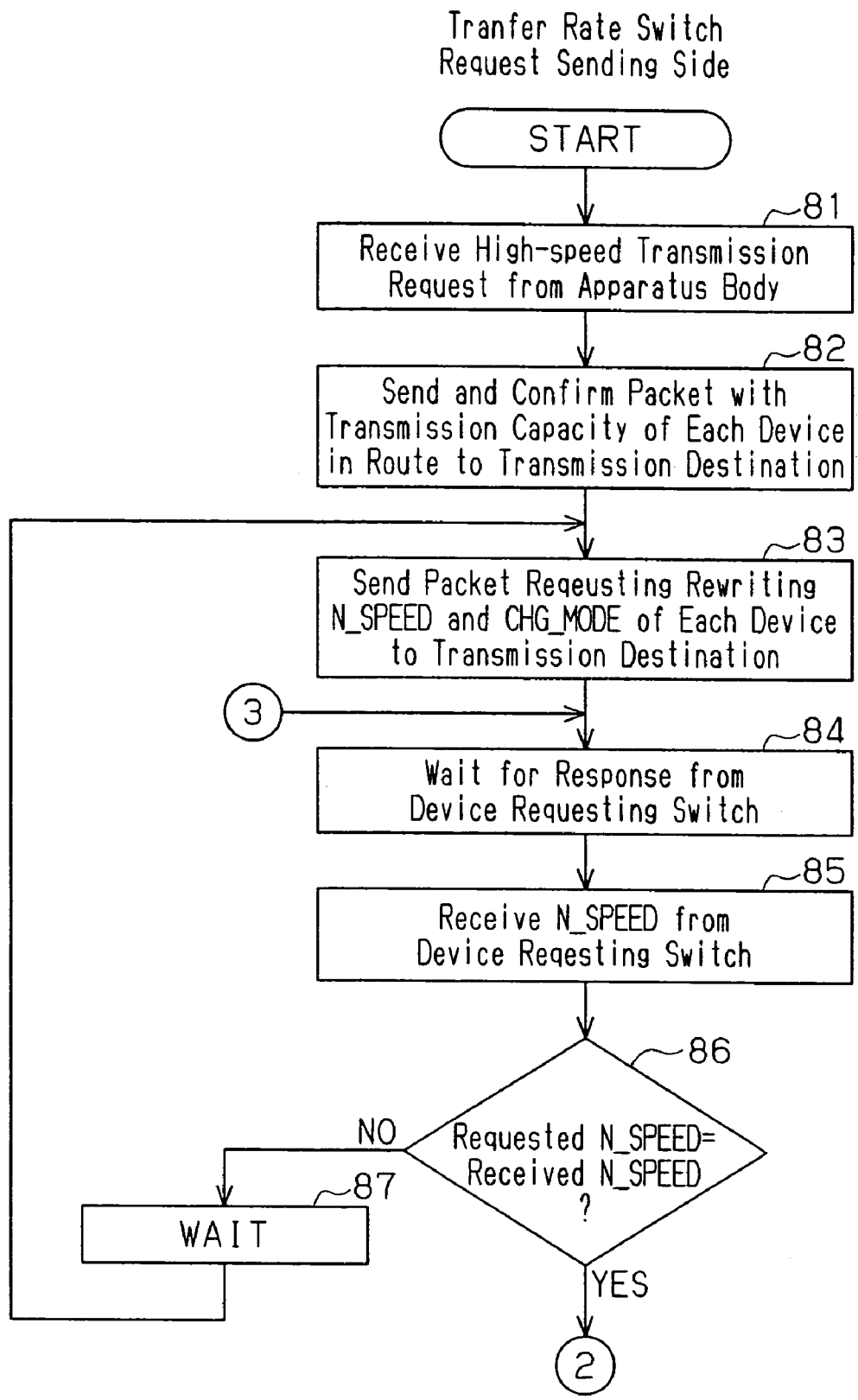
FIG. 8 is a flow chart illustrating a register control operation during transmission rate switching.
Figure 9:
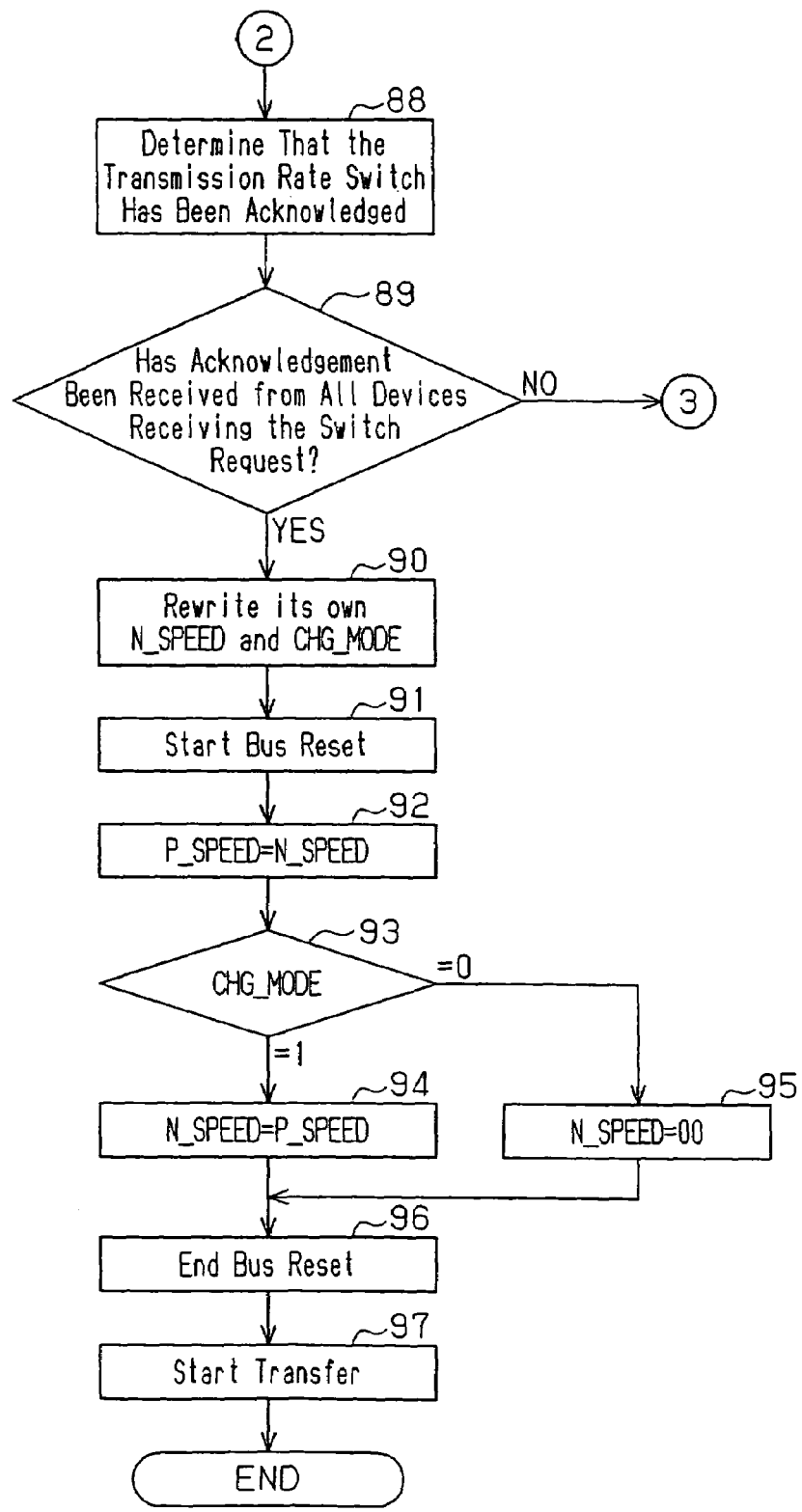
FIG. 9 is a flow chart illustrating the register control operation during transmission rate switching.
Figure 10:
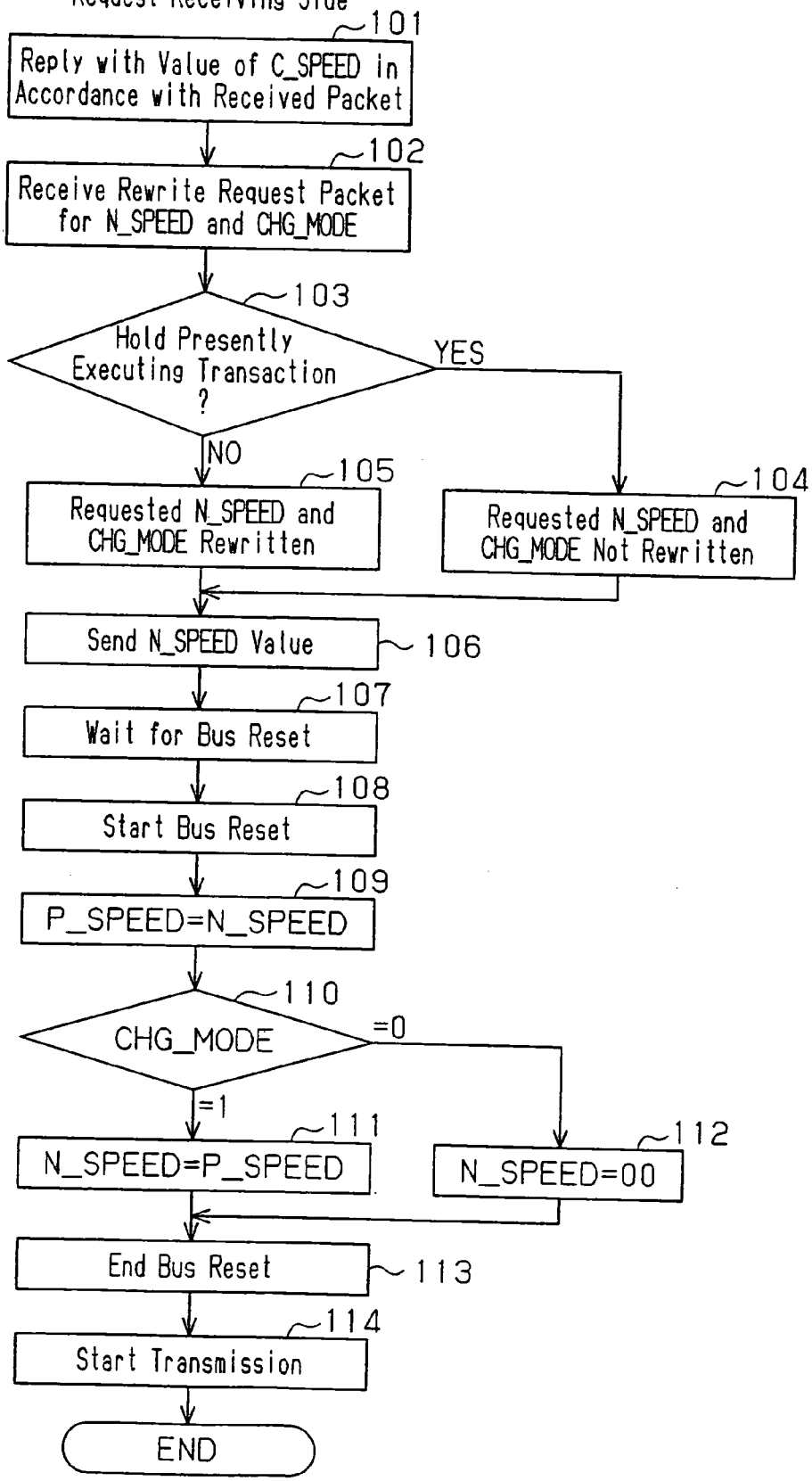
FIG. 10 is a flow chart illustrating the register control operation during transmission rate switching.

The control operation of the register 20 is described below with reference to FIGS. 8 through 10.

A plurality of devices in which the interface device 11 is installed as described above are connected by the 1394 bus 22. The node n1 is provided with the S400 transmission capacity.

First, the operation of node n1 when transmitting a transmission rate switch request will now be described with reference to FIGS. 8 and 9.

The node n1 is in a state operating at the S100 transmission capacity. From this state, for example, a need may arise for the node n1 to transfer data to the node n4 at a higher speed (S200 or S400) than S100. Thus, the node n1 receives a high-speed transmission request from the apparatus body 12 (refer to FIG. 1) (step 81).

The node n1 transmits a packet requesting the transmission capacity information of the nodes n2 through n4 to the nodes n2 through n4, which are in the route to the transfer destination, and confirms the transfer capabilities of each of the nodes n2 through n4 (step 82).

When all of the nodes n2 through n4 in the transmission route are provided with transfer capabilities that are capable of higher speed transmissions, the node n1 transmits to each of the nodes n2 through n4 a packet (request packet) requesting that they rewrite the N-SPEED and CHG-MODE in the respective nodes n2 through n4 (step 83). Then, the node n1 waits for replies from each node n2 through n4 (step 84).

When the N-SPEED is sequentially received from the nodes responding to the request packet (step 85), the node n1 determines whether or not the N-SPEED received from the node is the requested N-SPEED (step 86).

In step 86, when the received N-SPEED differs from the N-SPEED requested by the node n1, the node n1 sends the request again after a predetermined wait time has elapsed (step 87). That is, the request packet is again transmitted to the node. When the received N-SPEED matches the N-SPEED requested by the node n1, the node n1 determines that the switch request has been acknowledged by the node that received the N-SPEED request (step 88 in FIG. 9).

When the N-SPEED received from all of the nodes n2 through n4 match the requested N-SPEED (step 89), the node n1 rewrites its own N-SPEED and CHG-MODE (step 90). When even one node among all the nodes n2 through n4 replies with an N-SPEED that does not match the requested N-SPEED in step 89, the node n1 waits until receiving the requested N-SPEED from all the nodes n2 through n4 (repeat steps 84 through 89).

Then, when the bus reset starts in node n1 (step 91), the P-SPEED of the node n1 is switched to the previously rewritten N-SPEED (step 92). That is, the transmission rate of the node n1 is switched to high-speed transmission.

When the rewritten CHG-MODE is set at [1] in step 90, the N-SPEED of the node n1 is controlled at the P-SPEED (steps 93 and 94). That is, the present transmission rate of the node n1 is held even after the next bus reset ends. Conversely, when the CHG-MODE is set at [0], the N-SPEED of the node n1 is controlled at "00" (steps 93 and 95). That is, the present transmission rate of the node n1 is switched to S100 after the next bus reset ends.

Then, when the bus reset ends (step 96), the node n1 transfers a packet at the switched high-speed transmission rate (i.e., the N-SPEED rewritten in step 92) (step 97).

The operations of the nodes n2 through n4, which receive the transmission rate switch request from the node n1, are described below with reference to FIG. 10.

In the previously described step 82, the nodes n2 through n4, which received the packet requesting transmission capacity information from the node n1, reply by sending to the node n1 the value of their own C-SPEED (transmission capacity) (step 101).

Then, when a packet is received from the node n1 requesting that their N-SPEED and CHG-MODE. be rewritten (step 102), the nodes n2 through n4 determine whether or not to maintain the transaction presently being performed (step 103) as described above (refer to FIG. 6).

In step 103, the nodes that maintain the transaction presently being executed reply to the node n1 specifying the present transmission rate as the N-SPEED value without rewriting the N-SPEED and CHG-MODE requested by the node n1 (steps 104 and 106). The nodes that do not maintain the transaction presently being performed rewrite the N-SPEED and CHG-MODE requested by the node n1 and reply to the node n1 specifying the rewritten N-SPEED value (steps 105 and 106).

In step 106, the node that replied with the N-SPEED requested by the node n1 waits until a bus reset request packet is received from the node n1 (step 107) and starts the bus reset when the request is received (step 108).

Then, when the bus reset starts in each of the nodes n2 through n4, the P-SPEED of the nodes n2 through n4 are switched to a previously rewritten N-SPEED (step 109). That is, the transmission rates of the nodes n2 through n4 are switched to high-speed transmission.

Among the nodes n2 through n4, the N-SPEED of the nodes that rewrote their CHG-MODE to [1] in step 105 is controlled at the P-SPEED (steps 110 and 111). That is, the present transmission rate of this node is maintained even after the next bus reset ends.

Conversely, the N-SPEED of those nodes, among the nodes n2 through n4 that have a CHG-MODE of [0], is controlled to [00] (steps 110 and 112). That is, the present transmission rate of those nodes is switched to S100 after the next bus reset ends.

Then, when the bus reset ends (step 113), the nodes n2 through n4 perform packet transfer at the switched high-speed transmission rate (i.e., at the N-SPEED switched in step 109) (step 114).

Figure 11:
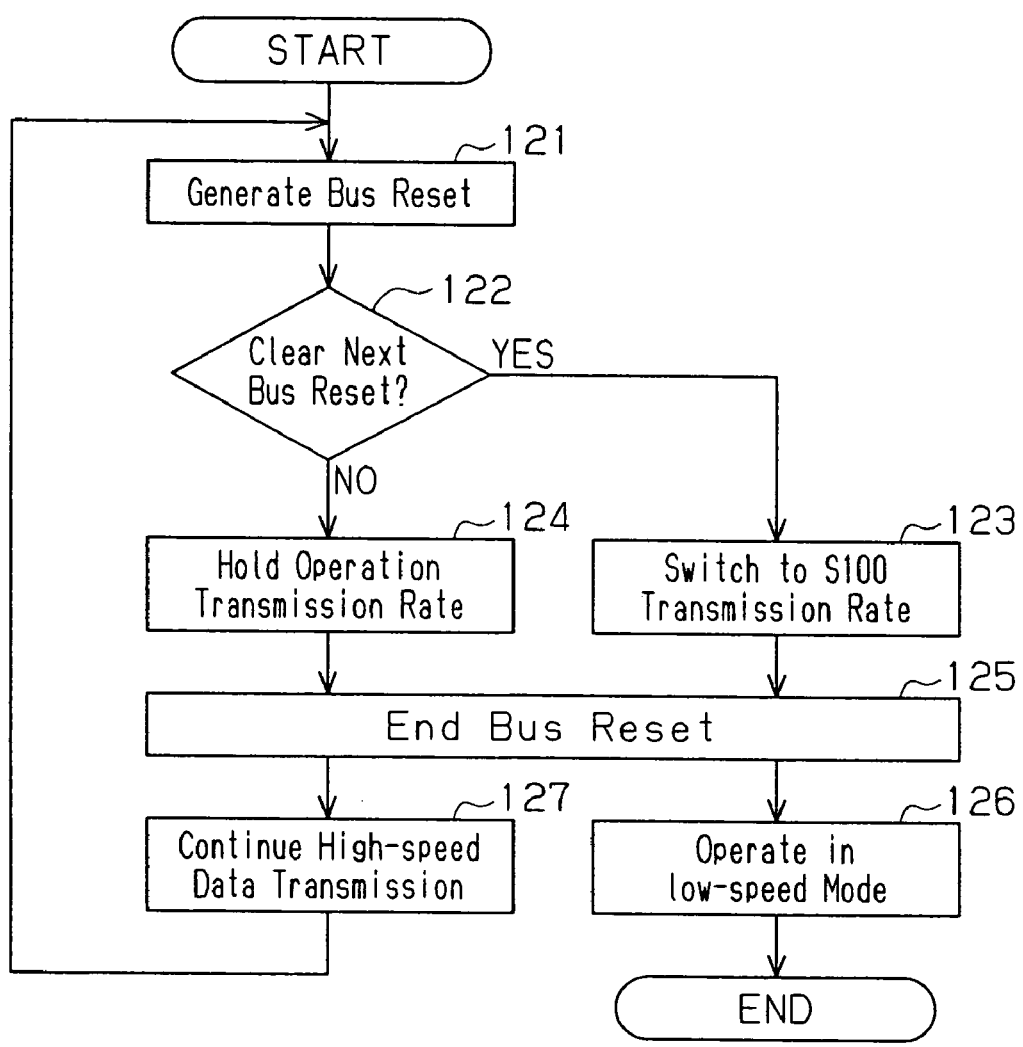
FIG. 11 is a flow chart illustrating the register control operation during transmission rate switching.
Figure 12:
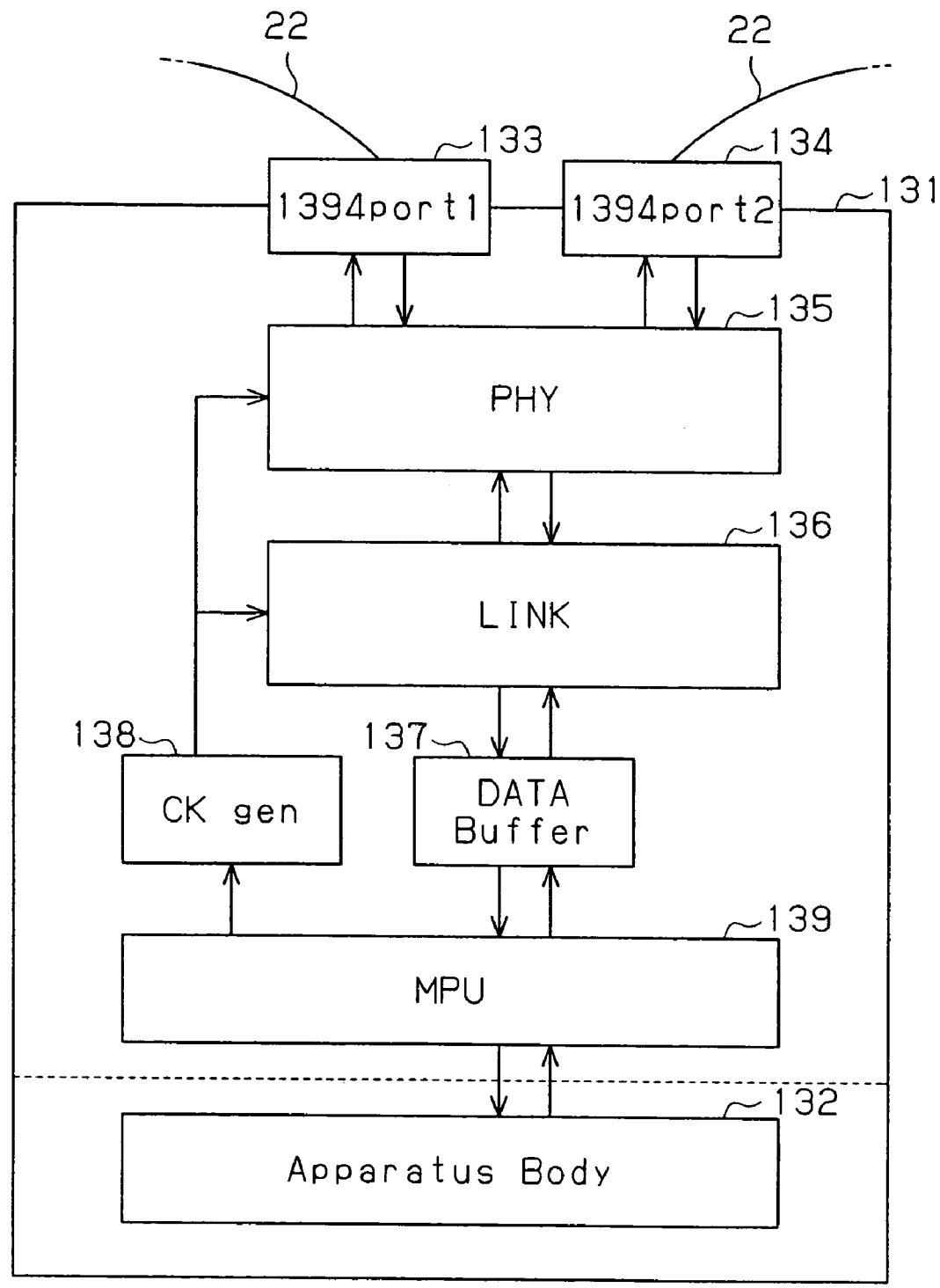
FIG. 12 is a block diagram of a conventional interface device.

The CHG-MODE control operation for the register 20 is described below with reference to FIG. 11.

As described above, the transmission rates of the nodes n1 through n4 are switched to a high-speed transmission rate (either S200 or S400), and when the subsequent packet transfer from the node n1 to the node n4 ends, the node n1 generates a bus reset (step 121).

Each of the nodes n1 through n4 determines whether or not to clear its operating state by a bus reset after the transfer ends based on the previously rewritten CHG-MODE (step 90 in FIG. 9 and step 105 in FIG. 10) (step 122).

When the determination is to clear the operating state in step 122 (CHG-MODE=[0]), the transmission rate of that node is switched to S100 (step 123). That is, after the bus reset ends, that node enters a state in which only low-speed transmission operation is possible at S100 (steps 125 and 126).

Conversely, when the determination is to not clear the operating state in step 122 (CHG-MODE=[1]), the transmission rate of that node is maintained at the high-speed (step 124). That is, after the bus reset ends, that node continues to have high-speed transmission enabled (steps 125 and 127).

The distinctive features of the interface device and interface device control method of the embodiment of the present invention are described below.

(1) The devices (nodes) incorporating the interface device 11 operate so as to only be capable of low-speed transmissions when performing low-speed transmissions and when transfer operations are not being performed. A node requiring a high-speed transmission negotiates with each of the nodes included in the route to the transfer destination, and when each node is provided with a transmission capacity that is applicable for high-speed transmission, the originating node and each of the other nodes switch their transmission rates to high-speed transmission. In this way, power consumption is reduced because only the node performing the high-speed transmission and each of the nodes included in the transmission route (repeaters) are operated in a state enabling high-speed transmission.

(2) Since a bus reset after the high-speed transmission is set to clear the operation state, the node performing high-speed transmission operation is enabled to perform low-speed transmission again. Accordingly, since the transmission rate may be switched to enable high-speed transmissions when required, unnecessary power consumption is suppressed. This reduces power consumption.

(3) The nodes which switch to high-speed transmission may also continue high-speed transmission by a prearranged setting which does not clear the operating state with a bus reset after a high-speed transmission ends. Therefore, when high-speed transmission is routinely required, procedures for switching to high-speed transmission is not required. Thus, the transmission capacity is not decreased.

The embodiment may be variously modified as described below.

Although an interface device 11 complying to the IEEE 1394 standard is used in the embodiment, the present invention is not restricted to such configuration and may be realized in any interface device providing functioning under a plurality of transmission rates.

Although the interface device 11 of the embodiment is provided with the S400, S200, and S100 transmission rates of the IEEE 1394 standard, the interface device may be provided with other transmission rates.

The data transmission method employed by the interface device 11, which is provided with a switching capability in the embodiment, may also be applied in isochronous transfer. That is, in isochronous transfer, an isochronous bandwidth is allocated beforehand to ensure that a constant amount of data is transferred in a predetermined time. When this type of isochronous transfer is performed among a plurality of nodes, the transmission rate may be switched to low-speed transmission or high-speed transmission in accordance with the allocated isochronous bandwidth.

Although the operating state is switched from high-speed transmission to low-speed transmission by clearing the operating state with a bus reset in the embodiment, the operating state may also be similarly switched from low-speed transmission to high-speed transmission, or switched to low-speed transmission by negotiation between nodes.

What is claimed is:

1. An interface device for performing data transmission with a further device coupled to a network at any of a plurality of transmission rates that are regulated, the interface device comprising:
   a transmission rate control circuit configured to generate a switch signal that changes an operation speed of the interface device when the transmission rate must be switched;
   a clock generation circuit configured to change a frequency in response to the switch signal and generate a clock signal having the changed frequency; and
   a register adapted to store first information of a transmission capacity of the interface device itself, second information of a transmission rate that is presently possible, and third information of a transmission rate to be switched to next,
   wherein the interface device negotiates with the further device using the first, second, and third information to determine a transmission rate, and the transmission rate control circuit changes the operation speed of the interface device in accordance with the determined transmission rate,
   wherein the register stores information for a mode for maintaining the present transmission rate after a bus reset, which occurs after data transmission according to the determined transmission rate, or information for a mode for switching to a transmission rate enabling a minimum speed transmission operation after a bust reset, as fourth information, and
   wherein the fourth information is transferred to the further device from the interface device during the negotiation.

2. The interface device of claim 1, wherein the switching of the transmission rate is executed when data transmission to the further device is required or when a request to switch to a different transmission rate is received from the further device.

3. The interface device of claim 1, wherein the transmission rate control circuit switches to a transmission rate enabling low-speed transmission during low-speed transmission and switches to a transmission rate enabling high-speed transmission when high-speed transmission is required.

4. The interface device of claim 1, wherein the transmission rate control circuit switches to a transmission rate enabling minimum speed transmission operation when starting operation for connection to the network or when data is not being transmitted.

5. The interface device of claim 1, wherein the information stored in the register is changeable by a bus reset.

6. The interface device according to claim 1,
   wherein the interface device rewrites the second information of the transmission rate that is presently possible into the third information of the transmission rate to be switched to next when a bus reset is performed.

7. The interface device according to claim 1,
   wherein the interface device sends the second information of the transmission rate that is presently possible instead of the third information of the transmission rate to be switched to next when maintaining a transaction presently being executed, and rewrites the third information of the transmission rate to be switched to next into information of a transmission rate requested by the further device when not maintaining the transaction presently being executed.

8. A method, comprising:
   configuring a transmission rate control circuit to change operation speed of at least one of a plurality of devices when a transmission rate must be switched;
   changing the operation speed of the at least one of the plurality of devices based on the configured transmission rate control circuit;
   registering first information of a transmission capacity of a device itself, second information of a transmission rate that is presently possible, and third information of a transmission rate to be switched to next,
   wherein said configuring the transmission rate control circuit includes configuring the transmission rate control circuit to generate a switch signal that changes the operation speed of the least one of a plurality of device, the method further comprising:
   configuring a clock generation circuit to change a frequency in response to the switch signal to generate a clock signal having the changed frequency; and
   the plurality of devices negotiating with each other using the first, second, and third information to determine a transmission rate,
   wherein registering the first, second, and third information includes registering information for a mode for maintaining the present transmission rate after a bus reset, which occurs after data transmission according to the determined transmission rate, or information for a mode for switching to a transmission rate enabling a minimum speed transmission operation after a bus reset, as fourth information, and
   wherein the fourth information is transferred to other devices from the at least one of the plurality of devices during the negotiation.

9. The method according to claim 8 further comprising of rewriting the second information of the transmission rate that is presently possible into the third information of the transmission rate to be switched to next when a bus reset is performed.

10. The method according to claim 8 further comprising of:
    sending the second information of the transmission rate that is presently possible instead of the third information of the transmission rate to be switched to next when maintaining a transaction presently being executed; and
    rewriting the third information of the transmission rate to be switched to next into information of a transmission rate requested by the other devices when not maintaining the transaction presently being executed.

* * * * *

UNITED STATES PATENT AND TRADEMARK OFFICE
CERTIFICATE OF CORRECTION

| | | |
|---|---|---|
| PATENT NO. | : 7,724,689 B2 | |
| APPLICATION NO. | : 10/725587 | |
| DATED | : May 25, 2010 | |
| INVENTOR(S) | : Hiroyuki Tsujimoto | |

It is certified that error appears in the above-identified patent and that said Letters Patent is hereby corrected as shown below:

Column 11, Line 45 delete "bust" and insert --bus--.

Column 12, Line 30 delete "device" and insert --devices--.

Column 12, Line 30 delete "the least" and insert --the at least--.

Signed and Sealed this
Fourth Day of January, 2011

David J. Kappos
*Director of the United States Patent and Trademark Office*